United States Patent
Luus et al.

(10) Patent No.: US 11,934,441 B2
(45) Date of Patent: Mar. 19, 2024

(54) GENERATIVE ONTOLOGY LEARNING AND NATURAL LANGUAGE PROCESSING WITH PREDICTIVE LANGUAGE MODELS

(71) Applicant: International Business Machines Corporation, Armonk, NY (US)

(72) Inventors: Francois Pierre Luus, Wierdapark (ZA); Etienne Eben Vos, Johannesburg (ZA); Ndivhuwo Makondo, Pretoria (ZA); Naweed Aghmad Khan, Johannesburg (ZA); Ismail Yunus Akhalwaya, Emmarentia (ZA)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 16/862,509

(22) Filed: Apr. 29, 2020

(65) Prior Publication Data
US 2021/0342380 A1 Nov. 4, 2021

(51) Int. Cl.
*G06F 16/00* (2019.01)
*G06F 16/36* (2019.01)
(Continued)

(52) U.S. Cl.
CPC ............ *G06F 16/367* (2019.01); *G06F 40/20* (2020.01); *G06N 3/047* (2023.01); *G06N 3/084* (2013.01)

(58) Field of Classification Search
None
See application file for complete search history.

(56) References Cited

U.S. PATENT DOCUMENTS 7,925,637 B2 4/2011 Ma et al.
9,069,848 B2 6/2015 Mukherjea et al.
(Continued)

FOREIGN PATENT DOCUMENTS

CA 2934808 A1 1/2017
EP 1903454 A1 3/2008
(Continued)

OTHER PUBLICATIONS

Ayadi. Sep. 2019. Ontology population with deep learning-based NLP: a case study on the Biomolecular Network Ontology, Procedia Computer Science. Sep. 2019.*
(Continued)

*Primary Examiner* — Tuankhanh D Phan
(74) *Attorney, Agent, or Firm* — Shimon Benjamin; Otterstedt & Kammer PLLC

(57) ABSTRACT

An ontology topic is selected and a pretrained predictive language model is primed to create a predictive primed model based on one or more ontological rules corresponding to the selected ontology topic. Using the predictive primed model, natural language text is generated based on the ontology topic and guidance of a prediction steering component. The predictive primed model is guided in selecting text that is predicted to be appropriate for the ontology topic and the generated natural language text. The generated natural language text is processed to generate extracted ontology rules and the extracted ontology rules are compared to one or more rules of an ontology rule database that correspond to the ontology topic. A check is performed to determine if a performance of the ontology extractor is acceptable.

19 Claims, 8 Drawing Sheets

(51) Int. Cl.
  *G06F 40/20* (2020.01)
  *G06N 3/047* (2023.01)
  *G06N 3/084* (2023.01)

(56) References Cited

U.S. PATENT DOCUMENTS

| | | |
|---|---|---|
| 9,104,779 B2 | 8/2015 | Hunt et al. |
| 9,495,345 B2 | 11/2016 | Munro et al. |
| 9,633,010 B2 | 4/2017 | Bird et al. |
| 10,095,689 B2 | 10/2018 | Lobez Comeras et al. |
| 2009/0012842 A1 | 1/2009 | Srinivasan et al. |
| 2009/0198642 A1 | 8/2009 | Akkiraju et al. |
| 2010/0100546 A1* | 4/2010 | Kohler .............. G06F 16/40 707/739 |
| 2013/0246049 A1 | 9/2013 | Mirhaji |
| 2013/0260358 A1 | 10/2013 | Lorge et al. |
| 2015/0106078 A1* | 4/2015 | Chang .............. G06F 16/35 704/9 |
| 2017/0337268 A1 | 11/2017 | Ait-Mokhtar et al. |
| 2018/0276273 A1 | 9/2018 | Mittal et al. |
| 2019/0213259 A1 | 7/2019 | Bacarella et al. |

FOREIGN PATENT DOCUMENTS

| | | |
|---|---|---|
| EP | 2246810 A1 | 11/2010 |
| WO | WO2009105114 A1 | 8/2009 |

OTHER PUBLICATIONS

Peter Mell and Timothy Grance, The NIST Definition of Cloud Computing, NIST Special Publication 800-145, Sep. 2011, cover, pp. i-iii and 1-3.

Bontcheva, Generating tailored textual summaries from ontologies, In European Semantic Web Conference, pp. 531-545, Springer, Berlin, Heidelberg, 2005.

Androutsopoulos et al., Generating Natural Language Descriptions from OWL Ontologies: A Detailed Presentation of the NaturalOWL System, Technical report, NLP Group, Department of Informatics, Athens University of Econom ics and Business, Greece, 2012.

Published Anonymously, Using Structured Knowledge Sources for Domain-Specific Ontology Extraction, IP.com, IPCOM000188568D, 2009, 2 pages.

Petrucci, et al., Expressive ontology learning as neural machine translation, Journal of Web Semantics 52, 2018, pp. 66-82 https://dkm-static.fbk.eu/people/rospocher/files/pubs/2018jws.pdf.

Bosselut et al., Comet: Commonsense Transformers for Automatic Knowledge Graph Construction, arXiv preprint arXiv:1906.05317, 18 pages, 2019.

Van Paasschen et al., Seq2Graph: A neural approach to scene graph generation from natural language., 10 pages http://web.stanford.edu/class/cs224n/reports/custom/15786023.pdf.

Xu et al., Graph2Seq: Graph to sequence learning with attention-based neural networks, arXiv preprint, arXiv:1804.00823, 18 pages, 2018.

Gehrmann et al., GLTR: Statistical Detection and Visualization of Generated Text, https://arxiv.org/abs/1906.04043, 6 pages.

Zellers et al., Defending Against Neural Fake News, 21 Pages https://arxiv.org/abs/1905.12616.

Foster et al., Reinforcement Learning with Analogical Similarity to Guide Schema Induction and Attention, arXiv preprint arXiv:1712.10070, 20 pages, 2017.

Nilsson et al., Ontograbbing: Extracting information from texts using generative ontologies, In International Conference on Flexible Query Answering Systems, 2009, pp. 275-286, Abstract Only—2 pages.

Petrucci et al., Ontology learning in the deep, In European Knowledge Acquisition Workshop, pp. 480-495, 2016.

Völker et al., Acquisition of OWL DL axioms from lexical resources. In European Semantic Web Conference, 2007, pp. 670-685.

Petrova et al., Formalizing biomedical concepts from textual definitions. Journal of biomedical semantics, 2015, 6:22, 17 pages.

English et al., Ontology Learning from Text Using Automatic Ontological-Semantic Text Annotation and the Web as the Corpus. In AAAI Spring Symposium: Machine Reading, 2007, pp. 43-48.

Ocampo-Guzman et al., Data-driven approach for ontology learning. In 2009 6th International Conference on Electrical Engineering, Computing Science and Automatic Control (CCE), 2009, pp. 1-6, IEEE.

Nirenburg et al., Learning by reading by learning to read. In International Conference on Semantic Computing (ICSC 2007), pp. 694-701, IEEE.

Bordes et al., Joint learning of words and meaning representations for open-text semantic parsing. In Artificial Intelligence and Statistics, 2012, pp. 127-135.

Yang et al. XLNet: Generalized Autoregressive Pretraining for Language Understanding, 33rd Conference on Neural Information Processing Systems (NeurIPS 2019), 18 pages.

BERT (language model), Wikipedia, downloaded Apr. 7, 2020, 3 pages.

Radford et al., Language models are unsupervised multitask learners, OpenAI Blog 1, No. 8, 2019, 24 pages.

* cited by examiner

GENERATIVE ONTOLOGY LEARNING AND NATURAL LANGUAGE PROCESSING WITH PREDICTIVE LANGUAGE MODELS

BACKGROUND

The present invention relates to the electrical, electronic and computer arts, and more specifically, to natural language processing and ontology generation.

Ontology learning deals with the creation of ontologies, either automatically or with human assistance. The online learning activities include the extraction, generation, and acquisition of ontologies from, for example, natural language text. Generally, noun phrases, terms, and the relationships between the terms are extracted from a natural language corpus and encoded into an ontology. The conventional automatic extraction and formulation of concept definitions (ontologies) from raw natural language text is generally error-prone and typically requires hand-engineered extraction methods with significant limitations in scope and expressivity.

SUMMARY

Principles of the invention provide techniques for generative ontology learning and natural language processing with predictive language models. In one aspect, an exemplary method includes the operations of selecting an ontology topic; priming, by an ontology topic primer, a pretrained predictive language model to create a predictive primed model based on one or more ontological rules corresponding to the selected ontology topic; generating, using the predictive primed model, natural language text based on the ontology topic and guidance of a prediction steering component; guiding, by the prediction steering component, the predictive primed model in selecting text that is predicted to be appropriate for the ontology topic and the generated natural language text; processing, by an ontology extractor, the generated natural language text to generate extracted ontology rules; comparing the extracted ontology rules to one or more rules of an ontology rule database that correspond to the ontology topic; and performing, by an ontology comparator, a check to determine if a performance of the ontology extractor is acceptable.

In one aspect, a non-transitory computer readable medium comprises computer executable instructions which when executed by a computer cause the computer to perform the method of implementing an ontology topic primer, a prediction steering component, an ontology extractor, and an ontology comparator; selecting an ontology topic; priming, by the ontology topic primer, a pretrained predictive language model to create a predictive primed model based on one or more ontological rules corresponding to the selected ontology topic; generating, using the predictive primed model, natural language text based on the ontology topic and guidance of the prediction steering component; guiding, by the prediction steering component, the predictive primed model in selecting text that is predicted to be appropriate for the ontology topic and the generated natural language text; processing, by the ontology extractor, the generated natural language text to generate extracted ontology rules; comparing, by the ontology comparator, the extracted ontology rules to one or more rules of an ontology rule database that correspond to the ontology topic; and performing, by the ontology comparator, a check to determine if a performance of the ontology extractor is acceptable.

In one aspect, an apparatus comprises a memory; and at least one processor, coupled to the memory, and operative to perform operations comprising implementing an ontology topic primer, a prediction steering component, an ontology extractor, and an ontology comparator; selecting an ontology topic; priming, by the ontology topic primer, a pretrained predictive language model to create a predictive primed model based on one or more ontological rules corresponding to the selected ontology topic; generating, using the predictive primed model, natural language text based on the ontology topic and guidance of a prediction steering component; guiding, by the prediction steering component, the predictive primed model in selecting text that is predicted to be appropriate for the ontology topic and the generated natural language text; processing, by the ontology extractor, the generated natural language text to generate extracted ontology rules; comparing the extracted ontology rules to one or more rules of an ontology rule database that correspond to the ontology topic; and performing, by the ontology comparator, a check to determine if a performance of the ontology extractor is acceptable.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

enabling logical natural-language understanding (NLU), intelligent natural-language processing (NLP), and improved reasoning by significantly expanding available ontologies for use in first-order logic (FOL) reasoning;

exploiting large-scale, open, and enterprise-specific text corpora for automated ontology learning, thus enabling large-scale unsupervised or distantly-supervised learning of FOL and reasoning for upper- and domain-specific ontologies;

enabling enterprise-specific customer/user support chatbots and information technology (IT) question and answer (Q&A) services without the need for labelled domain-specific ontology extraction training data;

adversarial training for expressive ontology learning on large-scale, full-spectrum text corpora (such as online encyclopedias);

improved automatic extraction and formulation of concept definitions (ontologies) from raw natural language text that is less error-prone and does not require hand-engineered extraction methods; and the accurate determination of ontologies with fewer CPU cycles.

These and other features and advantages of the present invention will become apparent from the following detailed description of illustrative embodiments thereof, which is to be read in connection with the accompanying drawings.

DETAILED DESCRIPTION

Figure 1:
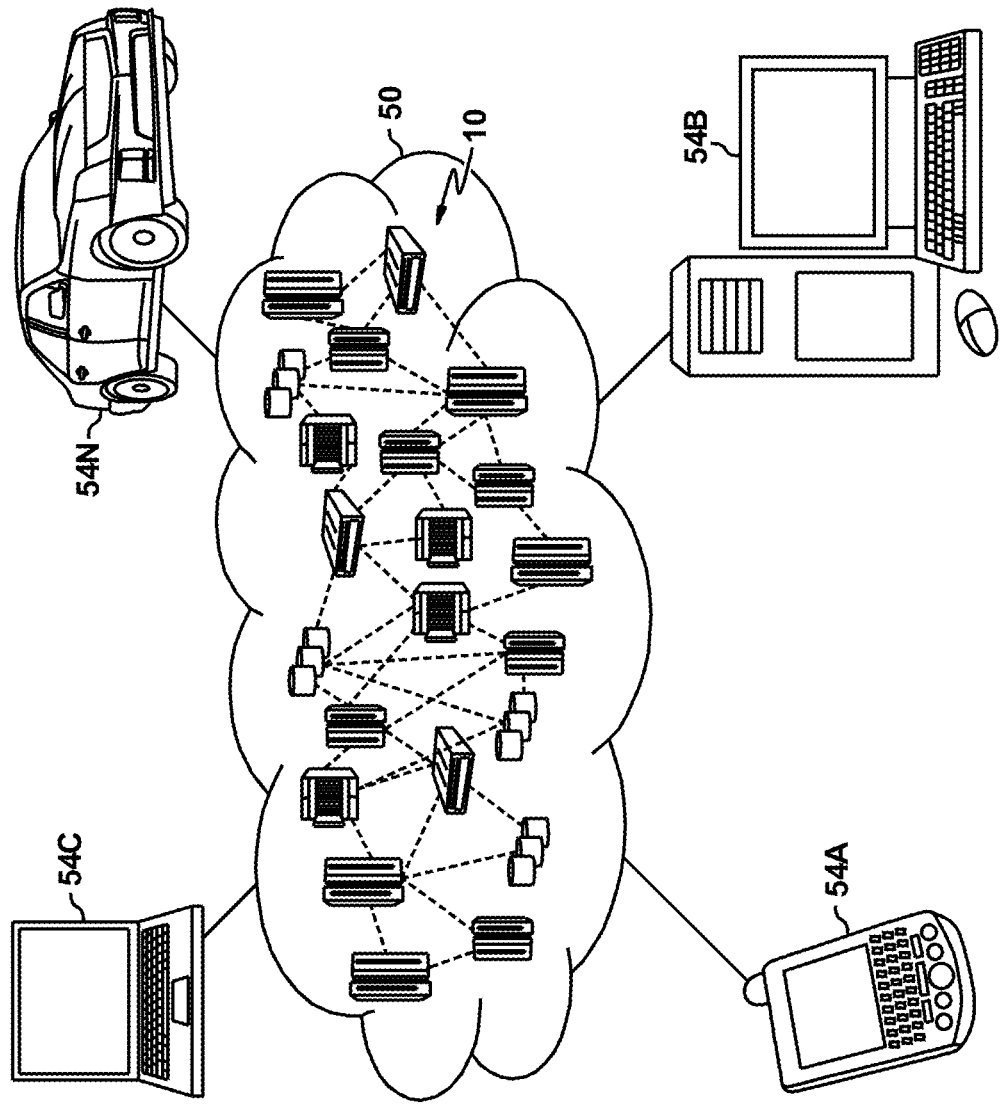
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
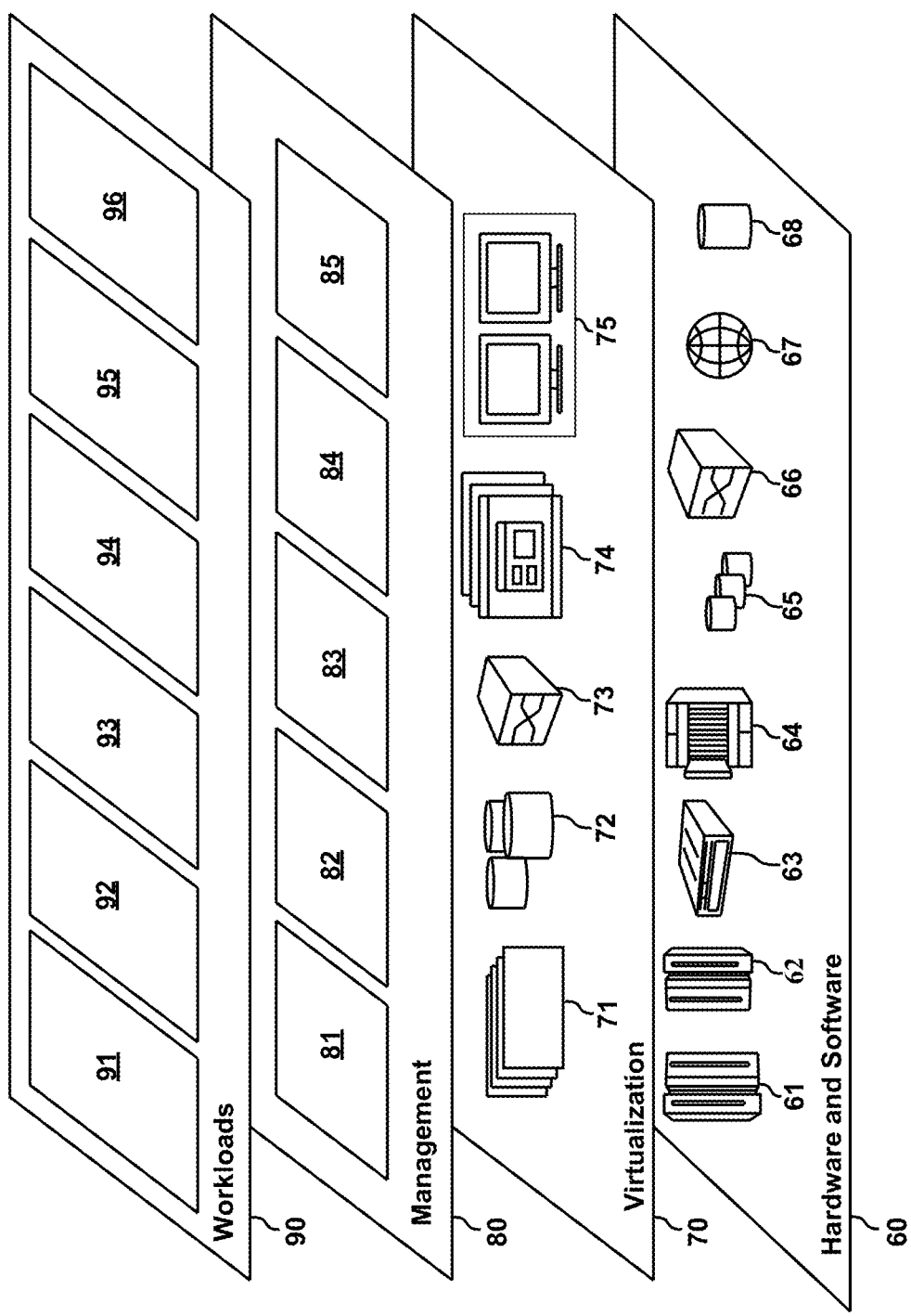
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and natural language processor and ontology generator 96.

Advancements in Automated Ontology Learning allow for the extraction of deeper and more expressive ontologies and, with the harnessing of ontological rules for first-order logical (FOL) reasoning, a potentially significant benefit to logical natural language understanding (NLU). Large-scale predictive language models like Bidirectional Encoder Representations from Transformers (BERT), GPT-2 and XLNet have shown exceptional natural language generation ability with notable content plausibility, if provided with a contextual priming from which they can predict a continuation. Bidirectional Encoder Representations from Transformers (BERT) is a technique for NLP (Natural Language Processing) pre-training; GPT-2 (Generative Pretrained Transformer 2) is a large transformer-based language model; and is a generalized autoregressive pretraining method. If large-scale labelled training data is available for ontology learning, then expressive and powerful ontology extractors can be trained in a supervised setting.

In one example embodiment, large-scale predictive language models (LMs) are used for generating natural language text (that contains ontological content) by priming the LM with a topic-related subset of ontological rules. The priming or transference of the LM to embody predetermined conceptual information can be learned to produce a dynamically improving training dataset including a coherent selection of ontological rules paired with generated natural language text that expressively and verbosely embed those rules. In one example embodiment, the learning of the LM transfer/priming is performed in an adversarial manner to leverage advances from generative adversarial networks (GANs). GANs learn to evaluate the "goodness" of generated data, which is a pertinent problem advantageously addressed by one or more embodiments. Comprehensive LMs pretrained on text corpora (such as online encyclopedias) containing upper-, mid-, and lower-ontologies may already be biased to generate ontologically-consistent information, which means they could be particularly well-suited for the proposed task. In addition, for the scenario where large-scale training data in the form of paired raw text and corresponding ontologies are not available, an approach is utilized to learn ontologies through a cyclic adversarial training algorithm that can leverage any raw text dataset as well as a dataset of example ontologies.

Overview of Paired Training Ontology-Extractor Approach

In one example embodiment, a primer (conditioner) for large-scale pretrained predictive language models and an ontology extractor are trained together to increase the comparison score between the source ontological rules and the extracted ontological rules, while simultaneously training the ontology comparator to distinguish between the source ontological rules and the extracted ontological rules. In one example embodiment, an adversarial training algorithm is implemented as an iterative stochastic gradient descent optimization with backpropagation of errors in the objectives of the ontology extractor, the ontology topic priming, and the ontology comparator. During a training phase, an existing training ontology is used to provide ontological rules and 1) the ontology topic primer is trained to produce natural language text that embodies given ontological rules; 2) the ontology extractor is trained to accurately extract ontological rules from natural language text, while 3) the ontology comparator is trained to recognize the correct ontological rules. In one example embodiment, the ontology comparator is a simple ontology matching algorithm using analogical similarity, in which a similarity score between two ontologies is computed by mapping corresponding relations between the ontologies and their role-filling objects. For a first-order language representation, the cost φ (M) of the mapping M: $O_s \rightarrow O_t$ is evaluated as shown below (adopted from Foster J M, Jones M. Reinforcement Learning with Analogical Similarity to Guide Schema Induction and Attention. arXiv preprint arXiv:1712.10070.2017 Dec. 28).

$$\varphi(M) =$$

$$\beta \cdot \sum_{o \in O_s} sim(o, M(o)) + \sum_{r \in O_s} sim(r, M(r)) \cdot \left[ 1 + \sum_{i=1}^{n_r} I_{\{M(child_i(r)) = child_i(M(r))\}} \right]$$

The above expression takes into account object similarity between two ontologies by comparing each object o in the source ontology $O_s$ to its image in the target ontology $O_t$; and by comparing each relation r in $O_s$ to its image in $O_t$. Parallel connectivity, as a result of having similarity between mutually mapped relations, adds to the similarity of any mutually mapped role-fillers (subjects and objects). The sim function is a primitive (object- and relation-level) similarity function, β is the weight of object similarity, $n_r$ the arity of relation r (i.e., the number of roles), $child_i(r)$ is the object filling the $i^{th}$ role of r, and $I_{\{P\}}$ is an indicator function equal to 1 when proposition P is true.

Given the cost of relational mapping above, the analogical similarity is then defined as the value of the best mapping:

$$sim(O_s, O_t) = \exp\left(\frac{max\varphi(M)}{M}\right)$$

During the testing or inference phase, the ontology extractor is used on raw natural language text corpora to produce extracted ontological rules.

Overview of Unpaired Training Approach of Ontology-Extractor and NL Text Synthesizer In one example embodiment, if corresponding ontologies for text are not available for training purposes, a dataset of any example ontology(ies) is utilized, assuming such is available, as well as any dataset of natural language text for which ontologies should be extracted. It is emphasized that, in this configuration, the training data includes unpaired text-ontology examples.

Figure 3:
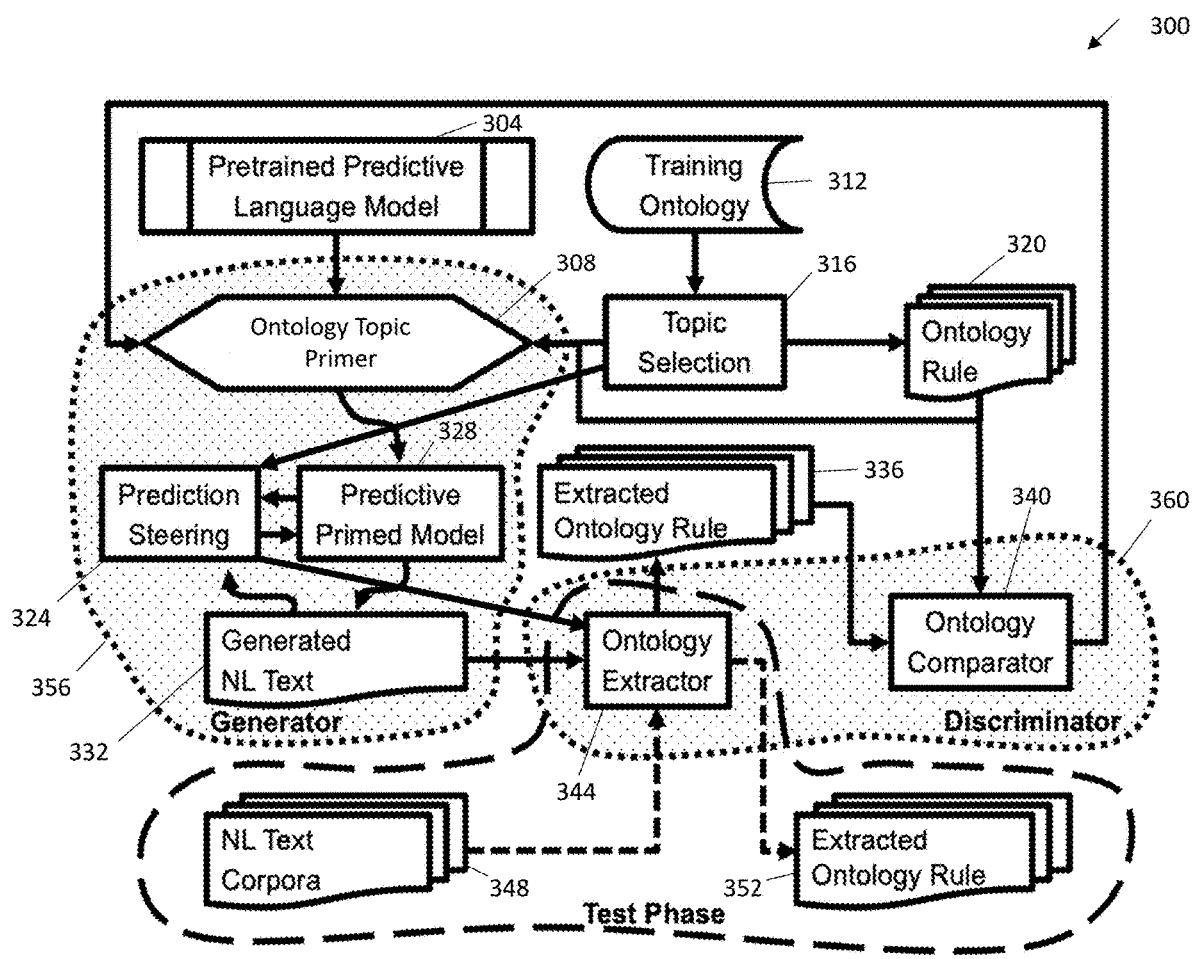
FIG. 3 is an example system for generating an ontology from natural language text and generating natural language text from an ontology, in accordance with an example embodiment.

FIG. 3 is an example system 300 for generating an ontology from natural language text and generating natural language text from an ontology, in accordance with an example embodiment. The task of ontology extraction can be viewed as a domain transformation problem where examples of natural text (sequences) have to be converted to one or many ontologies (graph-structured) that accurately capture the semantics and relations between entities in the text. Similarly, generating realistic natural and plausible text can be viewed as sampling an example text sequence that is conditioned on the underlying ontology. Each of these tasks can be performed by a neural network and combined in a single system 300 that optimizes both networks simultaneously.

In one example embodiment, an ontology topic primer 308, a prediction steering component 324, an ontology extractor 344 and, optionally, an ontology comparator 340 are trained entities for generating an ontology from natural language text and generating natural language text from an ontology. An ontology topic is initially selected (topic selection 316) for generating the natural language text 332 and ontology rules 336. The topic may be selected by a user or may be programmatically selected based on a taxonomy corresponding to a training ontology 312. In addition, topic selection can be implemented as a text search function that returns all ontological rules containing a specified search keyword/topic. A pretrained predictive language model 304 is "primed" by the ontology topic primer 308 to create a predictive primed model 328. For example, the pretrained predictive language model 304 may be given a paragraph of natural language text that contains a domain-specific keyword from the topic selection 316. The ontology topic primer 308 may be a sequence-to-sequence model implemented as a recurrent neural network model (that has a time dimension) taking as input the sequence of tokens from the ontological rules of the training ontology and outputting a sequence of natural language tokens that provides context to the pretrained predictive language model 304. In one example embodiment, the ontology topic primer 308 outputs a sequence of NL tokens that provides context to the pretrained predictive language model 304 based on seed text. It essentially learns the dependencies between words and how phrases are typically structured. The ontology topic primer 308 is run for enough steps to generate a full sequence of outputs embodied as a ranked list of the top words (based on probability) for generating the natural language text. The prediction steering is then based on the ranked list and the topic selection 316. The predictive primed model 328 sequentially outputs tokens that have the highest probability/softmax score where the topic selection 316 informs a reranking of probabilities to promote more relevant output tokens. In one or more embodiments, the operation of the Ontology Topic Primer 308 is learned rather than being defined directly, other than setting the ML model per se (e.g. seq2seq model).

Once generated, the predictive primed model 328 is used to generate natural language text 332 based on the topic selection 316. In essence, the goal is to produce realistic and plausible natural text conditioned based on a given ontology. As the natural language text 332 is generated, the prediction steering component 324 guides the predictive primed model 328 in selecting text that is predicted to be appropriate for the specified ontology and for the generated natural language text 332. For example, based on the ranked probability list, the prediction steering helps remove extraneous generated text, especially if the predictive primed model 328 was not well trained, thus making the generated text more accurate. In one example embodiment, the prediction steering modifies the probabilities of the predictive primed model 328. Indeed, the prediction steering component, in one or more embodiments, can modify the probabilities to pick more relevant tokens, thereby both guiding and effectively modifying the output.

The generated natural language text 332 is processed by an ontology extractor 344 (that is a component of an ontology discriminator 360) to generate one or more extracted ontology rules 336. The ontology extractor 344 can be a sequence-to-sequence model implemented as a recurrent neural network that takes as input the sequence of tokens from the generated NL text and outputs a sequence of tokens that express ontological rules. The extracted ontology rules 336 are compared to those rules of an ontology rule database 320 that correspond to the topic selection 316. In essence, the ontology comparator 340 evaluates how realistic the synthesized ontologies (the extracted ontology rules 336) are compared to ground-truth examples (those rules of the ontology rule database 320 that correspond to the topic selection 316) using a loss metric. As described above, in one example embodiment, the ontology comparator 340 is a simple ontology matching algorithm using analogical similarity, in which a similarity score between two ontologies is computed by mapping corresponding relations between the ontologies and their role-filling objects. In one example embodiment, the ontology comparator 340 is trained using machine learning. In one example embodiment, the ontology comparator 340 is a binary classifier implemented as a neural network that takes a set of token sequences, converts it into a vector (state) embedding, and decides whether the ontology rule(s) was generatively extracted or was obtained from the source rule-set (the ontology rule database 320). In one example embodiment, if the ontology rules have well defined data structures, the ontology comparator 340 is hardcoded.

The result generated by the ontology comparator 340 is an indication of the performance of the ontology extractor 344 and is used to "fine tune" the ontology extractor 344 and the ontology topic primer 308. In one example embodiment, the ontology extractor 344 is also a sequence-to-sequence neural network. At the end of the training phase, the text-to-ontology generator (the ontology discriminator 360) can be used to automate ontology extraction, whereas the ontology-to-text generator 356 can be used for producing plausible natural text that is grounded to a specific ontology.

Once the performance of the ontology extractor 344 is acceptable, the ontology extractor 344 may be used in a test or production environment to generate extracted ontology rules 352 for other natural language corpora 348. In one example embodiment, the performance of the ontology extractor 344 is acceptable when the change in loss measure is less than some small epsilon, or discretely if the extracted ontology matches the original.

In summary, each generator and discriminator in the system 300 optimizes its own objective in the following way:
1) the text-to-ontology generator (the ontology extractor 344) attempts to produce realistic ontologies in order to maximize the loss of the ontology discriminator (the ontology comparator 340);
2) the ontology comparator 340 attempts to correctly classify the real ontologies and synthesized ontologies to minimize its loss;
3) the ontology-to-text generator 356 attempts to reproduce the original text conditioned on the synthesized ontologies in order to maximize the loss of the text discriminator (not shown); and
4) the text discriminator attempts to correctly classify between the real and ontology-synthesized text examples to minimize its loss.

Figure 4:
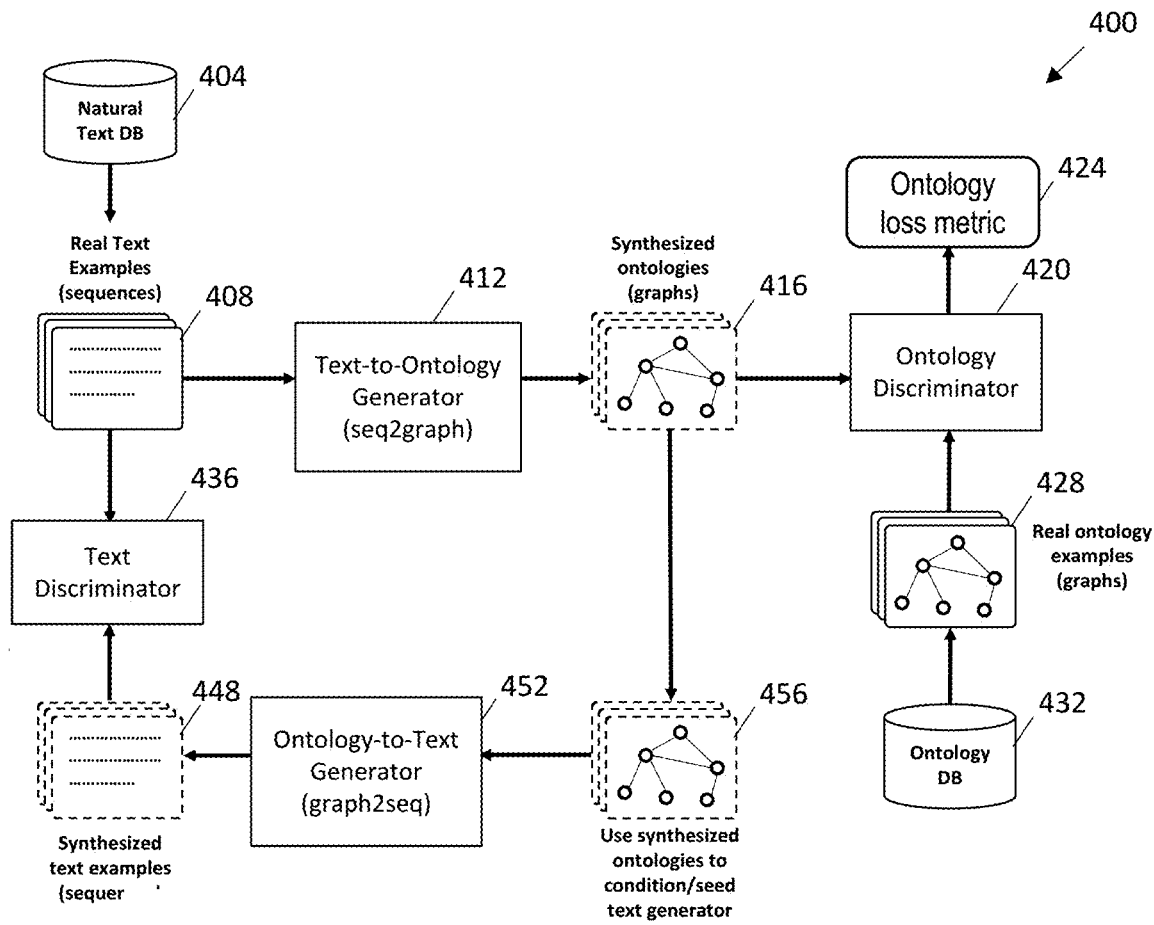
FIG. 4 is an overview of a second example system for generating an ontology from natural language text and generating natural language text from an ontology, in accordance with an example embodiment.

FIG. 4 is an overview of a second example system 400 for generating an ontology from natural language text and generating natural language text from an ontology, in accordance with an example embodiment. A text-to-ontology generator 412 takes natural language (real) text examples 408 (e.g. from database 404) for a given domain (or from different domains) as input and attempts to synthesize the corresponding ontologies 416. In one example embodiment, the text-to-ontology generator 412 transforms the generated natural language corpus into ontology graphs. An ontology discriminator 420 evaluates how realistic the synthesized ontologies 416 are compared to ground-truth examples (real ontology examples 428) from an ontology database 432 using a loss metric 424. In the second phase of the training cycle, a subset 456 of the synthesized ontologies 416 are used as input for an ontology-to-text generator 452, the goal of which is to produce realistic and plausible natural text examples 448 conditioned based on a given ontology. A text discriminator 436 compares the synthesized text examples 448 to the original text (natural language (real) text examples 408) used as input for the text-to-ontology generator 412, the former of which should resemble the latter. The comparison results in a binary outcome indicating whether the synthesized text examples 448 match the original text (natural language (real) text examples 408).

Similar to system 300 of FIG. 3, each generator and discriminator optimizes its own objective in the following way:
1) the text-to-ontology generator 412 attempts to produce realistic ontologies in order to maximize the loss of the ontology discriminator 420;
2) the ontology discriminator 420 attempts to correctly classify the real ontologies and synthesized ontologies 416 to minimize its loss;
3) the ontology-to-text generator 452 attempts to reproduce the original text conditioned on the synthesized ontologies 416 in order to maximize the loss of the text discriminator 436; and
4) the text discriminator 436 attempts to correctly classify between the real and ontology-synthesized text examples to minimize its loss.

At the end of the training phase, the text-to-ontology generator 412 can be used to automate ontology extraction, whereas the ontology-to-text generator 452 can be used for producing plausible natural text that is grounded to a specific ontology.

Figure 5:
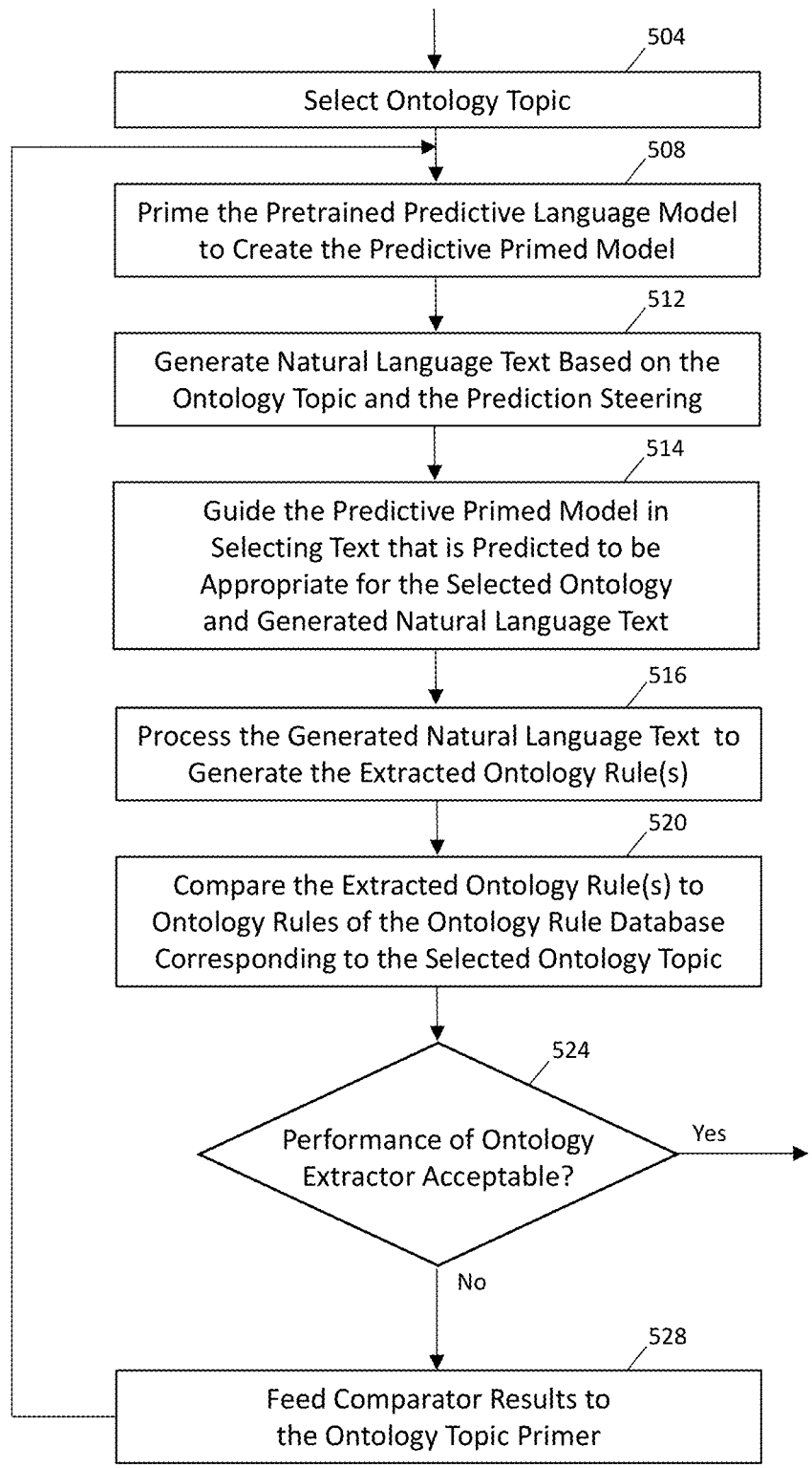
FIG. 5 is a flowchart for an example method for training the system of FIG. 3, in accordance with an example embodiment.

FIG. 5 is a flowchart for an example method for training the system 300, in accordance with an example embodiment. In one example embodiment, an ontology topic (topic selection 316) is selected (operation 504). The topic may be selected by a user or may be selected automatically by the system. In one example embodiment exhibiting large-scale training of the system 300, all possible topics having sufficient ontological coverage are used as training subjects creating a programmatic or iterative coverage of topics.

Based on the topic selection 316 and the results of the ontology comparison (if currently available), the ontology topic primer 308 primes the pretrained predictive language model 304 to create a predictive primed model 328 (operation 508). The predictive primed model 328 is used to generate natural language text 332 based on the topic selection 316 and the guidance of the prediction steering component 324 (operation 512). As noted above, the prediction steering component 324 guides the predictive primed model 328 in selecting text that is predicted to be appropriate for the specified ontology and generated natural language text 332 (operation 514).

The generated natural language text 332 is processed by the ontology extractor 344 to generate the extracted ontology rules 336 (operation 516). The extracted ontology rules 336 are compared to those rules of an ontology rule database 320 that correspond to the topic selection 316 (operation 520). A check is then performed to determine if the performance of the ontology extractor 344 is acceptable (decision block 524). If the performance of the ontology extractor 344 is acceptable (YES branch), the method 500 ends; otherwise (NO branch), the results generated by the ontology comparator 340 are fed to the ontology topic primer 308 (operation 528) and the method 500 proceeds with operation 508. In one example embodiment, backpropagation updates the parameters of the parameterized components to reduce the error observed in the ontology comparator 340.

Figure 6:
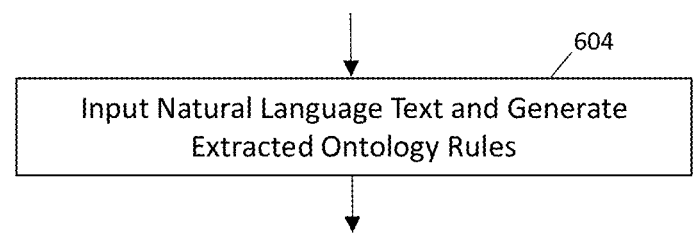
FIG. 6 is a flowchart for an example method for utilizing the system of FIG. 3 to generate an ontology from given natural language text, in accordance with an example embodiment.

FIG. 6 is a flowchart for an example method for utilizing the system 300 to generate an ontology from given natural language text, in accordance with an example embodiment. In one example embodiment, the given natural language text is input to the ontology extractor 344 and the extracted ontology rules 336 are generated (operation 604).

Figure 7:
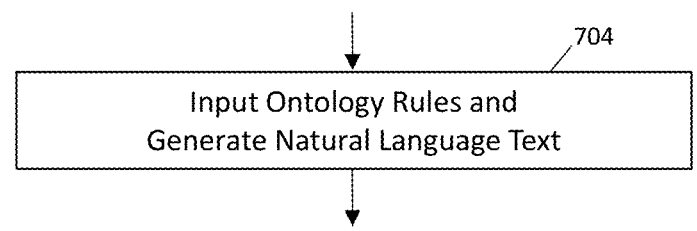
FIG. 7 is a flowchart for an example method for utilizing the system of FIG. 3 to generate natural language text from a given ontology, in accordance with an example embodiment.

FIG. 7 is a flowchart for an example method for utilizing the system 300 to generate natural language text from a given ontology, in accordance with an example embodiment. In one example embodiment, the given ontology is input to the predictive primed model 328 and the natural language text 332 is generated (operation 704).

Example 1

Example Summary:
1. Topic Selection: Bees
2. Ontology Rules: a. "Bees subset of insect." b. "Bees produce honey."
3. Ontology Topic Priming: "Explain why bees subset of insect? How do bees produce honey?"
4. Generated NL text: "Bees are flying insects closely related to wasps and ants, known for their role in pollination and; in the case of the best-known bee species, the western honey bee, for producing, honey and beeswax,"
5. Extracted Ontology Rules: "Bees subset flying insects." "Bees related wasps." "Bees related ants." "Bees role pollination." "Honey bees producing honey."
6. Ontology Comparator: [Indirectly present] "Bees subset of insect." [Indirectly present] "Bees produce honey."
7. [Optimized] Generated NL Text: "Bees are (remove: flying) insects closely related to wasps and ants, known for their role in pollination and, (remove: in the case of the best-known bee species, the western honey bee) for producing honey and beeswax."
8. [Optimized] Extracted Ontology Rules: "Bees subset insects." "Bees related wasps." "Bees related ants." "Bees producing honey."
9. [Optimized] Ontology Comparator: [Present] "Bees subset of insect."[Present] "Bees produce honey."

In the above example, the topic selected is "bees." Ontology rules a) and b) set forth two facts related to the selected topic. The pretrained predictive language model 304 was primed with the natural language text: "Explain why bees subset of insect? How do bees produce honey?" The generated natural language text 332 (4) was then generated by the predictive primed model 328. Five ontology rules (5) are extracted from the natural language text 332 by the ontology extractor 344 which determines that two of the ground-truth ontology rules ("Bees subset of insect." "Bees produce honey.") are indirectly present in the extracted ontology rules 336. The optimized generated natural language text 332 (7) was generated as a result of further training of the prediction steering component 324. The optimized extracted ontology rules 336 (8) were generated as a result of further training of the ontology extractor 344. The optimized ontology comparator can be, for example, a trained seq2seq model that has learned to identify real from extracted ontologies, or rate how realistic extracted ontologies are.

Figure 8:
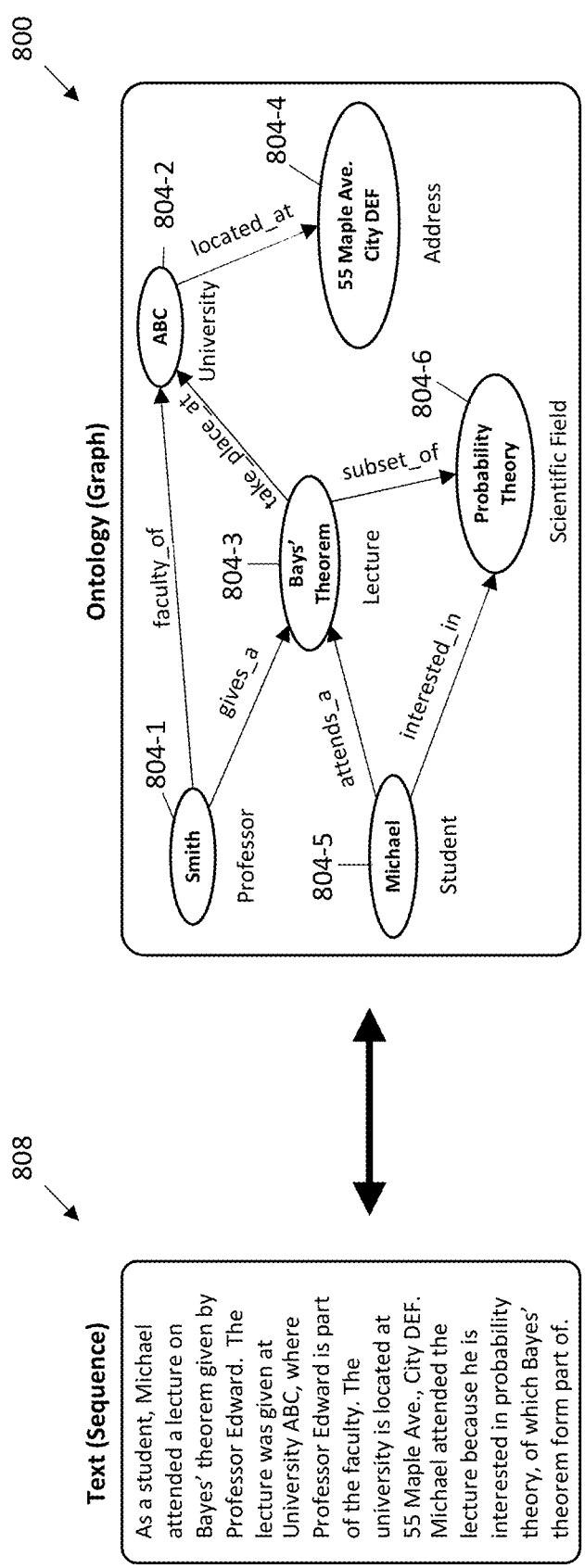
FIG. 8 illustrates an example of natural language text and a corresponding ontology graph for the field of academia, in accordance with an example embodiment.

FIG. 8 illustrates an example of natural language text 808 and a corresponding ontology graph 800 for the field of academia, in accordance with an example embodiment. The ontology graph 800 represents the structured facts and ontology rules extracted from the natural language text 808. In the ontology domain, entities such as "Smith" and "Bays' Theorem" can have properties (as indicated by the text under each node). Each node represents a subject/object entity and each edge represents a predicate. For example, node 804-1 representing "Smith" has the property "Professor" and node 804-3 representing "Bays' Theorem" has the property "Lecture." Connections between nodes 804-1, 804-2, 804-3, 804-4, 804-5, and 804-6 characterize the semantic relationship between entities. For example, the connection between nodes 804-1 and 804-3 indicates that Professor Smith "gives a" lecture on Bayes' Theorem.

Given the discussion thus far, it will be appreciated that, in general terms, an exemplary method, according to an aspect of the invention, includes the operations of selecting an ontology topic 316 (operation 504); priming, by an ontology topic primer 308, a pretrained predictive language model 304 to create a predictive primed model 328 (operation 508) based on one or more ontological rules corresponding to the selected ontology topic 316; generating, using the predictive primed model 328, natural language text 332 based on the ontology topic 316 and guidance of a prediction steering component 324 (operation 512); guiding, by the prediction steering component 324, the predictive primed model 328 in selecting text that is predicted to be appropriate for the ontology topic 316 and the generated natural language text 332 (operation 514); processing, by an ontology extractor 344, the generated natural language text 332 to generate extracted ontology rules 336 (operation 516); comparing the extracted ontology rules 336 to one or more rules of an ontology rule database 320 that correspond to the ontology topic 316 (operation 520); and performing, by an ontology comparator 340, a check to determine if a performance of the ontology extractor 344 is acceptable (operation 524).

In one aspect, a non-transitory computer readable medium comprises computer executable instructions which when executed by a computer cause the computer to perform the method of implementing an ontology topic primer, a prediction steering component, an ontology extractor, and an ontology comparator; selecting an ontology topic 316 (operation 504); priming, by the ontology topic primer 308, a pretrained predictive language model 304 to create a predictive primed model 328 (operation 508) based on one or more ontological rules corresponding to the selected ontology topic 316; generating, using the predictive primed model 328, natural language text 332 based on the ontology topic 316 and guidance of the prediction steering component 324 (operation 512); guiding, by the prediction steering component 324, the predictive primed model 328 in selecting text that is predicted to be appropriate for the ontology topic 316 and the generated natural language text 332 (operation 514); processing, by the ontology extractor 344, the generated natural language text 332 to generate extracted ontology rules 336 (operation 516); comparing, by the ontology comparator 340, the extracted ontology rules 336 to one or more rules of an ontology rule database 320 that correspond to the ontology topic 316 (operation 520); and performing, by the ontology comparator 340, a check to determine if a performance of the ontology extractor 344 is acceptable (operation 524).

In one aspect, an apparatus comprises a memory; and at least one processor, coupled to the memory, and operative to perform operations comprising selecting an ontology topic 316 (operation 504); priming, by an ontology topic primer 308, a pretrained predictive language model 304 to create a predictive primed model 328 (operation 508) based on one or more ontological rules corresponding to the selected ontology topic 316; generating, using the predictive primed model 328, natural language text 332 based on the ontology topic 316 and guidance of a prediction steering component 324 (operation 512); guiding, by the prediction steering component 324, the predictive primed model 328 in selecting text that is predicted to be appropriate for the ontology topic 316 and the generated natural language text 332 (operation 514); processing, by an ontology extractor 344, the generated natural language text 332 to generate extracted ontology rules 336 (operation 516); comparing the extracted ontology rules 336 to one or more rules of an ontology rule database 320 that correspond to the ontology topic 316 (operation 520); and performing, by an ontology comparator 340, a check to determine if a performance of the ontology extractor 344 is acceptable (operation 524). In one or more embodiments, the processor, by executing instructions in the memory, implements the ontology topic primer, the prediction steering component, the ontology extractor, and the ontology comparator.

In one example embodiment, the priming, generating, guiding, processing, comparing, and performing operations are repeated, wherein the priming of the pretrained predictive language model 304 uses results generated by the ontology comparator 340 and a sequence of natural language tokens generated by the ontology topic primer 308 that provides context to the pretrained predictive language model 304. In one example embodiment, a coherent selection of ontological rules is paired with natural language text that expressively and verbosely embeds the selection of ontological rules to generate a training dataset for training the ontology system. In one example embodiment, the ontology extractor 344, the ontology topic primer 308, and the ontology comparator 340 are trained using an adversarial training algorithm implemented as an iterative stochastic gradient descent optimization with a backpropagation of errors in one or more objectives.

In one example embodiment, the ontology topic primer 308 comprises a sequence-to-sequence model implemented as a recurrent neural network model having a time dimension, and the ontology topic primer 308 is trained to produce natural language text that embodies given ontological rules, taking as input a sequence of tokens from one or more ontological rules of the ontology rule database 320, and outputting a sequence of natural language tokens. In one example embodiment, the predictive primed model is seeded using a topic selection output to prime the predictive primed model with one or more of dictionary definitions and topic concepts prompting an ontology-to-text generator comprising the pretrained predictive language model 304 to sequentially output words and consequently generate a corpus. In one example embodiment, the prediction steering component 324 is trained based on a ranked list of probabilities of a given word appearing in natural language text corresponding to the topic selection 316. In one example embodiment, a production of ontologies is attempted in order to maximize a loss of an ontology comparator 340.

In one example embodiment, the ontology extractor 344 comprises a sequence-to-sequence model implemented as a recurrent neural network that takes as input a sequence of tokens from the generated natural language text 332, and a sequence of tokens that express ontological rules is outputted. In one example embodiment, the extracted ontology rules 336 capture semantics and relations between entities in the generated natural language text 332. In one example embodiment, the ontology comparator 340 comprises an ontology matching algorithm using analogical similarity, and a similarity score between two ontologies is computed by mapping corresponding relations between each ontology and one or more corresponding role-filling objects. In one example embodiment, the ontology comparator 340 comprises a binary classifier implemented as a neural network that takes a set of token sequences as input. The set is converted into a vector embedding and assessment is made of whether the set was one of generatively extracted and originating from the ontology rule database 320.

In one example embodiment, an attempt is made to correctly classify the extracted ontology rules 336 as one of one or more rules of an ontology rule database 320 that correspond to one or more of the ontology topic 316 and a synthesized ontology to minimize a loss metric. In one example embodiment, a result of the comparison comprises an indication of the performance of the ontology extractor 344 and is used to train the ontology extractor 344 and the ontology topic primer 308. In one example embodiment, an attempt is made to correctly classify given natural language text as one of ontology-synthesized text and genuine natural language text to minimize a loss metric.

Figure 9:
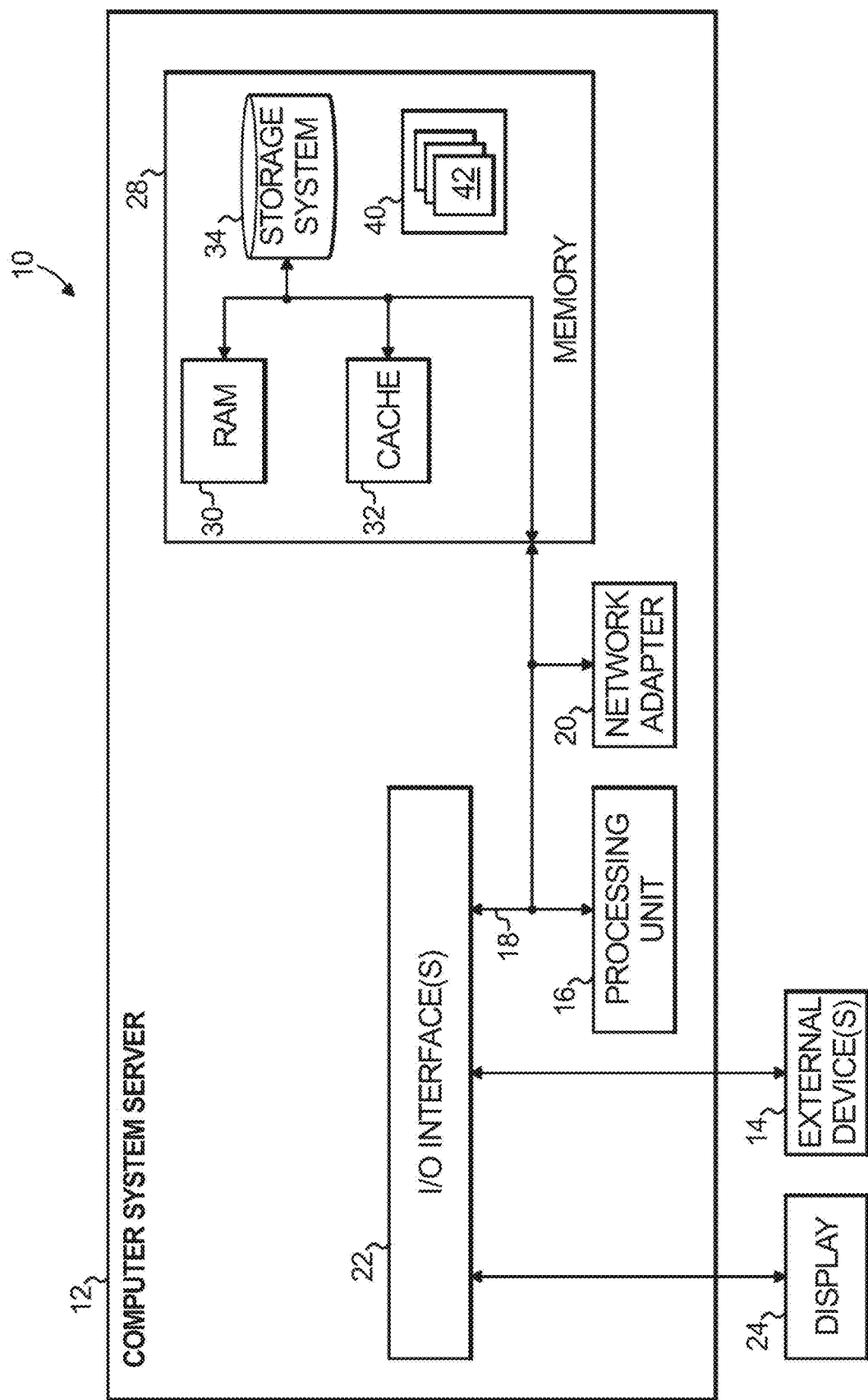
FIG. 9 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 9 depicts a computer system that may be useful in implementing one or more aspects and/or elements of the invention, also representative of a cloud computing node according to an embodiment of the present invention. Referring now to FIG. 9, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for training an ontology system, the method comprising:
    selecting an ontology topic;
    priming, by an ontology topic primer, a pretrained predictive language model to create a predictive primed model based on one or more ontological rules corresponding to the selected ontology topic;
    generating, using the predictive primed model, natural language text based on the ontology topic and guidance of a prediction steering component;
    guiding, by the prediction steering component, the predictive primed model in selecting text that is predicted to be appropriate for the ontology topic and the generated natural language text;
    processing, by an ontology extractor, the generated natural language text to generate extracted ontology rules;
    comparing the extracted ontology rules to one or more rules of an ontology rule database that correspond to the ontology topic, wherein a result of the comparison comprises an indication of a performance of the ontology extractor;
    training the ontology extractor and the ontology topic primer based on the result of the comparison; and
    performing, by an ontology comparator, a check to determine if a performance of the ontology extractor is acceptable.

2. The method of claim 1, further comprising repeating the priming, generating, guiding, processing, comparing, and performing operations, wherein the priming of the pretrained predictive language model uses results generated by the ontology comparator and a sequence of natural language tokens generated by the ontology topic primer that provides context to the pretrained predictive language model.

3. The method of claim 1, further comprising pairing a coherent selection of ontological rules with natural language text that expressively and verbosely embeds the selection of ontological rules to generate a training dataset for training the ontology system.

4. The method of claim 1, further comprising training the ontology extractor, the ontology topic primer, and the ontology comparator using an adversarial training algorithm implemented as an iterative stochastic gradient descent optimization with a backpropagation of errors in one or more objectives.

5. The method of claim 1, wherein the ontology topic primer comprises a sequence-to-sequence model implemented as a recurrent neural network model having a time dimension, the method further comprising training the ontology topic primer to produce natural language text that embodies given ontological rules, taking as input a sequence of tokens from one or more ontological rules of the ontology rule database, and outputting a sequence of natural language tokens.

6. The method of claim 1, further comprising seeding the predictive primed model using a topic selection output to prime the predictive primed model with one or more of dictionary definitions and topic concepts prompting an ontology-to-text generator comprising the pretrained predictive language model to sequentially output words and consequently generate a corpus.

7. The method of claim 1, further comprising training the prediction steering component based on a ranked list of probabilities of a given word appearing in natural language text corresponding to the topic selection.

8. The method of claim 1, further comprising attempting production of ontologies in order to maximize a loss of an ontology comparator.

9. The method of claim 1, wherein the ontology extractor comprises a sequence-to-sequence model implemented as a recurrent neural network that takes as input a sequence of tokens from the generated natural language text, the method further comprising outputting a sequence of tokens that express ontological rules.

10. The method of claim 1, the extracted ontology rules capture semantics and relations between entities in the generated natural language text.

11. The method of claim 1, wherein the ontology comparator comprises an ontology matching algorithm using analogical similarity, the method further comprising computing a similarity score between two ontologies by mapping corresponding relations between each ontology and one or more corresponding role-filling objects.

12. The method of claim 1, wherein the ontology comparator comprises a binary classifier implemented as a neural network that takes a set of token sequences as input, the method further comprising converting the set into a vector embedding, and assessing whether the set was one of generatively extracted and originating from the ontology rule database.

13. The method of claim 1, further comprising attempting to correctly classify the extracted ontology rules as one of one or more rules of an ontology rule database that correspond to one or more of the ontology topic and a synthesized ontology to minimize a loss metric.

14. The method of claim 1, further comprising attempting to correctly classify given natural language text as one of ontology-synthesized text and genuine natural language text to minimize a loss metric.

15. A non-transitory computer readable medium comprising computer executable instructions which when executed by a computer cause the computer to perform the method of:
implementing an ontology topic primer, a prediction steering component, an ontology extractor, and an ontology comparator;
selecting an ontology topic;
priming, by the ontology topic primer, a pretrained predictive language model to create a predictive primed model based on one or more ontological rules corresponding to the selected ontology topic;
generating, using the predictive primed model, natural language text based on the ontology topic and guidance of the prediction steering component;
guiding, by the prediction steering component, the predictive primed model in selecting text that is predicted to be appropriate for the ontology topic and the generated natural language text;
processing, by the ontology extractor, the generated natural language text to generate extracted ontology rules;
comparing, by the ontology comparator, the extracted ontology rules to one or more rules of an ontology rule database that correspond to the ontology topic, wherein a result of the comparison comprises an indication of a performance of the ontology extractor;
training the ontology extractor and the ontology topic primer based on the result of the comparison; and
performing, by the ontology comparator, a check to determine if a performance of the ontology extractor is acceptable.

16. An apparatus comprising:
a memory; and
at least one processor, coupled to the memory, and operative to perform operations comprising:
implementing an ontology topic primer, a prediction steering component, an ontology extractor, and an ontology comparator
selecting an ontology topic;
priming, by the ontology topic primer, a pretrained predictive language model to create a predictive primed model based on one or more ontological rules corresponding to the selected ontology topic;
generating, using the predictive primed model, natural language text based on the ontology topic and guidance of a prediction steering component;
guiding, by the prediction steering component, the predictive primed model in selecting text that is predicted to be appropriate for the ontology topic and the generated natural language text;
processing, by the ontology extractor, the generated natural language text to generate extracted ontology rules;
comparing the extracted ontology rules to one or more rules of an ontology rule database that correspond to the ontology topic, wherein a result of the comparison comprises an indication of a performance of the ontology extractor;
training the ontology extractor and the ontology topic primer based on the result of the comparison; and
performing, by the ontology comparator, a check to determine if a performance of the ontology extractor is acceptable.

17. The apparatus of claim 16, the operations further comprising training the ontology extractor, the ontology topic primer, and the ontology comparator using an adversarial training algorithm implemented as an iterative stochastic gradient descent optimization with a backpropagation of errors in one or more objectives.

18. The apparatus of claim 16, wherein the ontology topic primer comprises a sequence-to-sequence model implemented as a recurrent neural network model having a time dimension, the operations further comprising training the ontology topic primer to produce natural language text that embodies given ontological rules, taking as input a sequence of tokens from one or more ontological rules of the ontology rule database, and outputting a sequence of natural language tokens.

19. The apparatus of claim 16, wherein the ontology comparator comprises an ontology matching algorithm using analogical similarity, the operations further comprising computing a similarity score between two ontologies by mapping corresponding relations between each ontology and one or more corresponding role-filling objects.

* * * * *